(12) United States Patent
Wang et al.

(10) Patent No.: US 11,363,341 B2
(45) Date of Patent: Jun. 14, 2022

(54) METHOD AND APPARATUS FOR INTERACTING IN LIVE BROADCAST ROOM

(71) Applicant: BEIJING DAJIA INTERNET INFORMATION TECHNOLOGY CO., LTD., Beijing (CN)

(72) Inventors: Xingyu Wang, Beijing (CN); Jianxin Lu, Beijing (CN); Yijun Cheng, Beijing (CN); Yu Lei, Beijing (CN); Hao Huang, Beijing (CN); Liyao Sun, Beijing (CN); Yu Liu, Beijing (CN); Hao Tian, Beijing (CN); Shangsheng Li, Beijing (CN); Man Luo, Beijing (CN); Cheng Zhang, Beijing (CN); Jiabin Wan, Beijing (CN)

(73) Assignee: Beijing Dajia Internet Information Technology Co., Ltd., Beijing (CN)

( * ) Notice: Subject to any disclaimer, the term of this patent is extended or adjusted under 35 U.S.C. 154(b) by 0 days.

(21) Appl. No.: 17/394,474

(22) Filed: Aug. 5, 2021

(65) Prior Publication Data

US 2022/0070538 A1    Mar. 3, 2022

(30) Foreign Application Priority Data

Sep. 2, 2020    (CN) .......................... 202010910750.8

(51) Int. Cl.
*H04N 21/47* (2011.01)
*H04N 21/431* (2011.01)
(Continued)

(52) U.S. Cl.
CPC ..... *H04N 21/4788* (2013.01); *H04N 21/2187* (2013.01); *H04N 21/4312* (2013.01)

(58) Field of Classification Search
CPC .......... H04N 21/4788; H04N 21/2187; H04N 21/4312; H04N 21/47202; H04N 21/4781;
(Continued)

(56) References Cited

U.S. PATENT DOCUMENTS 9,591,083 B1    3/2017 Gumbula
9,723,242 B1    8/2017 Fulay et al.
(Continued)

FOREIGN PATENT DOCUMENTS

CN    106034261 A    10/2016
CN    106331739 A    1/2017
(Continued)

OTHER PUBLICATIONS

European Patent Office, Search Report for EP application 21190106.1, dated Jan. 28, 2022.
(Continued)

*Primary Examiner* — Alazar Tilahun
(74) *Attorney, Agent, or Firm* — Timothy W. Menasco, Esq.; Harter Secrest & Emery LLP

(57) ABSTRACT

A method and an apparatus for interactions in a live broadcast room are disclosed. The method may include: in response to an opening operation for a question interaction function in a live broadcast room: obtaining at least one piece of question information from a server and displaying the at least one piece of question information in a first display area of the live broadcast room, in which the at least one piece of question information is sent by at least one audience client to the server; obtaining an interaction parameter value corresponding to each piece of question information from the server; and adjusting a position of the question
(Continued)

information in the first display area based on the interaction parameter value corresponding to each piece of question information.

14 Claims, 13 Drawing Sheets

(51) Int. Cl.
*H04N 21/21* (2011.01)
*H04N 21/4788* (2011.01)
*H04N 21/2187* (2011.01)

(58) Field of Classification Search
CPC ........... H04N 21/4758; H04N 21/4751; H04N 21/485; H04L 65/608; H04L 65/1059; H04L 65/4069; H04L 67/306; H04L 65/1083; H04L 65/4015
See application file for complete search history.

(56) References Cited

U.S. PATENT DOCUMENTS

| | | | |
|---|---|---|---|
| 2008/0120101 A1* | 5/2008 | Johnson | G10L 15/22 704/E15.04 |
| 2010/0199294 A1* | 8/2010 | Choi | H04N 21/4758 725/13 |
| 2014/0019882 A1* | 1/2014 | Chew | H04L 65/40 715/753 |
| 2016/0189407 A1* | 6/2016 | Hodgson | G06T 11/60 715/204 |
| 2018/0108266 A1* | 4/2018 | Stoner | H04L 65/4023 |
| 2018/0130076 A1* | 5/2018 | Celik | G06Q 30/0267 |
| 2018/0160180 A1* | 6/2018 | Kedenburg, III | H04N 21/4788 |
| 2018/0351756 A1* | 12/2018 | Dave | H04L 12/1818 |
| 2018/0352303 A1* | 12/2018 | Siddique | H04L 65/1069 |
| 2018/0359530 A1* | 12/2018 | Marlow | H04M 3/563 |
| 2019/0247748 A1* | 8/2019 | Yusupov | H04N 21/4781 |

FOREIGN PATENT DOCUMENTS

| | | |
|---|---|---|
| CN | 106791895 A | 5/2017 |
| CN | 108259936 A | 7/2018 |
| CN | 109429075 A | 3/2019 |
| CN | 109688480 A | 4/2019 |
| CN | 305420146 S | 11/2019 |
| WO | 2014166383 A1 | 10/2014 |

OTHER PUBLICATIONS

The State Intellectual Property Office of People's Republic of China, OA for CN application 202010910750.8 with English translation.

* cited by examiner

METHOD AND APPARATUS FOR INTERACTING IN LIVE BROADCAST ROOM

CROSS REFERENCE TO RELATED APPLICATIONS

This application claims priority to Chinese Patent Application No. 202010910750.8, filed on Sep. 2, 2020, the content of which is incorporated herein by reference in its entirety.

TECHNICAL FIELD

The disclosure relates to the field of Internet technology, and more particularly to a method and an apparatus for interactions in a live broadcast room, an electronic device and a storage medium.

BACKGROUND

With the rapid development of Internet technology, webcasting has entered the public view as a new technical field. Users may watch a wonderful performance of an anchor in the live broadcast room on their respective terminals, and may interact with the anchor in real time. In the related art, the audiences in the live broadcast room usually do text communication with the anchor through the comment area, and the anchor interacts with the audience according to the information in the comment area.

SUMMARY

According to a first aspect of the disclosure, a method for interactions in a live broadcast room may be applied to an anchor client. The method includes: in response to an opening operation for a question interaction function in the live broadcast room: obtaining at least one piece of question information from a server and displaying the at least one piece of question information in a first display area of the live broadcast room, wherein the at least one piece of question information is sent by at least one audience client to the server; obtaining an interaction parameter value corresponding to each piece of question information from the server; and adjusting a position of the question information in the first display area based on the interaction parameter value corresponding to each piece of question information.

According to a second aspect of the disclosure, a method for interactions in a live broadcast room may be applied to an audience client. The method includes: in response to a triggering operation on a question initiating control, displaying a panel interface in a third display area of the live broadcast room, wherein the question initiating control is generated after a question interaction function in the live broadcast room is opened, and the question initiating panel interface contains a question button; in response to a triggering operation on the question button, popping up a question input box at a target position on the panel interface; and displaying question information inputted by a user into the question input box, and sending the question information to a server, so that the server sends the question information to an anchor client and other audience clients than the audience client in the live broadcast room for display.

According to a third aspect of the embodiments of the disclosure, an apparatus for interactions in a live broadcast room may be applied to an anchor client. The apparatus includes a processor and a memory for storing instructions executable by the processor. The processor may be configured to in response to an opening operation for a question interaction function in the live broadcast room: obtain at least one piece of question information from a server, in which the at least one piece of question information is sent by at least one audience client to the server; display the at least one piece of question information in a first display area of the live broadcast room; obtain an interaction parameter value corresponding to each piece of question information from the server; and adjust a position of the question information in the first display area based on the interaction parameter value corresponding to each piece of question information.

It should be understood that the above general description and the following detailed description are only exemplary and explanatory, without any limitations to the disclosure.

BRIEF DESCRIPTION OF THE DRAWINGS

The drawings herein are incorporated into the specification and constitute a part of the specification, show embodiments in accordance with the disclosure, and are used to explain the principle of the disclosure together with the specification, which do not constitute a limitation to the disclosure.

DETAILED DESCRIPTION

In order to make those skilled in the art better understand the technical solutions of the disclosure, the technical solutions in the embodiments of the disclosure will be clearly and thoroughly described with reference to the accompanying drawings.

It should be noted that the terms such as "first" and "second" in the specification, claims and the above-mentioned drawings of the disclosure are used to distinguish similar objects, and not necessarily used to describe a specific sequence or precedence order. It should be understood that the data used in this way may be interchanged under appropriate circumstances so that the embodiments of the disclosure described herein may be implemented in an order other than those illustrated or described herein. The implementations described in the example embodiments below do not represent all implementations consistent with the disclosure. Rather, they are merely examples of apparatuses and methods consistent with some aspects of the disclosure as detailed in the appended claims.

In the related art, the anchor generally interacts with the audience according to the information in the comment area. However, this kind of interaction method is relatively monotonous, and it is difficult for the anchor to find the audience's interaction questions, which is not convenient for interactions in the live broadcast room and makes an interaction atmosphere in the live broadcast room worse. In order to solve such problem in the related art, the disclosure provides a method and an apparatus for interactions in a live broadcast room.

Figure 1:
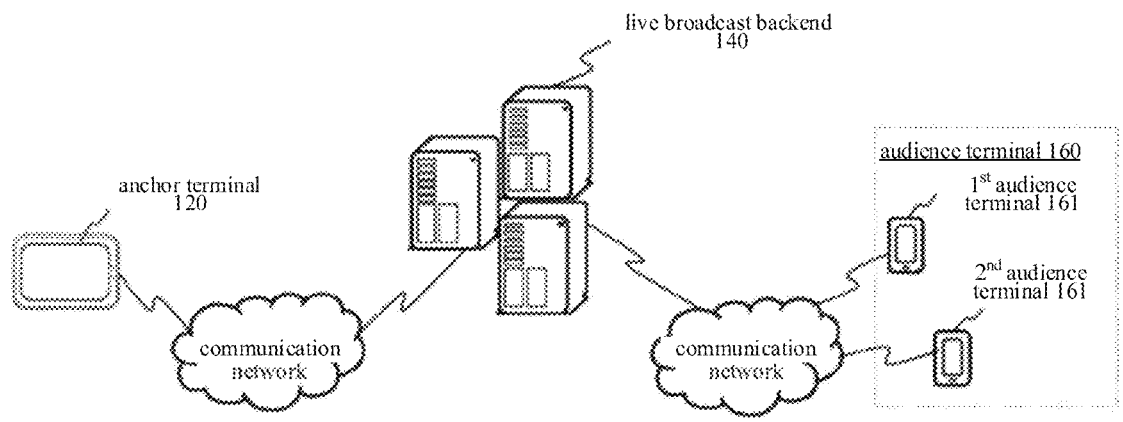
FIG. 1 is a structural schematic diagram of a live broadcast system according to an embodiment of the disclosure.

FIG. 1 is a structural schematic diagram of a live broadcast system according to an embodiment of the disclosure. The live broadcast system includes an anchor terminal 120, a live broadcast backend 140 and an audience terminal 160. An anchor client runs on the anchor terminal 120. The anchor terminal 120 may be a mobile phone, a tablet computer, an e-book reader, a moving picture experts group audio layer III (MP3) player and a moving picture experts group audio layer IV (MP4) player, a laptop and a desktop computer, etc. The anchor client is a software client used by an anchor user to record a live video stream in the live broadcast room and send the live video stream to the live broadcast backend 140.

The live broadcast backend 140 is a server, or consists of several servers, or a virtualization platform, or a cloud computing service center. Optionally, the live broadcast backend 140 includes a server for realizing a live broadcast function, a server for managing user accounts, a server for managing live broadcast rooms, and a server for realizing a interaction video. Optionally, the live broadcast backend 140 includes a video server, a picture server, and the like.

The live broadcast backend 140 is connected through a communication network to the audience terminal 160. Optionally, the communication network is a wired network or a wireless network.

An audience client runs on the audience terminal 160. The audience terminal 160 is a mobile phone, a tablet computer, an e-book reader, an MP3 player, an MP4 player, a laptop and a desktop computer, etc. The audience client is a client used to watch the live video stream in the live broadcast room.

There may be two or more audience terminals 160. The audience terminal 160 may include a first audience terminal 161 and a second audience terminal 162. A first audience client runs on the first audience terminal 161, and a second audience client runs on the second audience terminal 162. The first audience terminal 161 is configured to receive live video streams and interaction videos sent by the live broadcast backend 140, record interaction videos when audiences are watching the live video streams and send the interaction videos to the live broadcast backend 140. The second audience terminal 162 is another audience terminal other than the first audience terminal 161, and is configured to receive live video streams and interaction videos sent by the live broadcast backend 140. Optionally, the number of the first audience terminal 161 and the second audience terminal 162 is more than one.

Generally, the anchor terminal 120 sends a live video stream to the live broadcast backend 140. The live backend 140 receives and forwards the live video stream to the anchor terminal 120, the first audience terminal 161, and the second audience terminal 162.

In the process of watching the live video stream, the first audience terminal 161 sends an interaction video to the live broadcast backend 140. The live broadcast backend 140 receives and forwards the interaction video to the anchor terminal 120, the first audience terminal 161 and the second audience terminal 162 in the same live broadcast room. The interaction video is a video to be played by being superimposed on a local area in the live interface of the anchor client and/or audience client.

Optionally, standard communication technologies and/or protocols are used in the above-mentioned wireless network or wired network. The network is usually the Internet, but may also be any network, including but not limited to any combination of a local area network (LAN), a metropolitan area network (MAN), a wide area network (WAN), a mobile network, a wired or wireless network, a private network or a virtual private network. In some embodiments, technologies and/or formats including a hyper text mark-up language (HTML), an extensible markup language (XML), etc. are used to represent data exchanged over the network. In addition, conventional encryption technologies such as a secure socket layer (SSL), a transport layer security (TLS), a virtual private network (VPN), an Internet protocol security (IPsec) may also be used to encrypt all or some of links. In other embodiments, customized and/or dedicated data communication technologies may also be used to replace or supplement the above data communication technologies.

In order to be able to enrich the interaction mode between the anchor and the audience and meet diverse interaction demands from the users. The disclosure provides a method and an apparatus for interactions in a live broadcast room, an electronic device and a storage medium. Specifically, the method and the apparatus for interactions in a live broadcast room, the electronic device and the storage medium according to the embodiments of the disclosure are described below with reference to the accompanying drawings.

First of all, it should be noted that the method for interactions in a live broadcast room according to the embodiments of the disclosure may be executed by the apparatus for interactions in a live broadcast room according to the embodiments of the disclosure that may be implemented in software and/or hardware. The apparatus may be configured in an electronic device that installs and runs a live broadcast application. It should be noted that, the live broadcast room refers to a display interface of the anchor client or audience client. The electronic device may include but are not limited to hardware devices with various operating systems such as a smart phone and a tablet computer.

Figure 2:
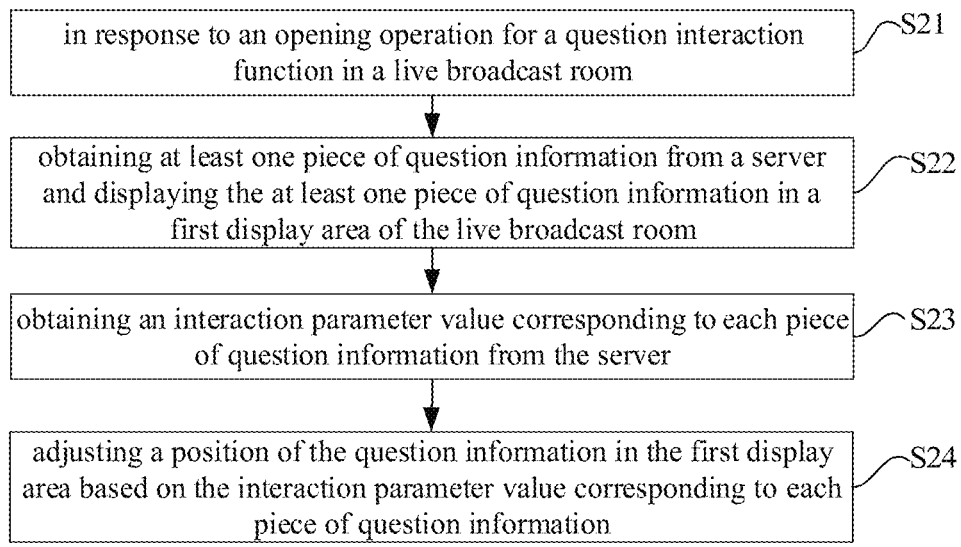
FIG. 2 is a flow chart illustrating a method for interactions in a live broadcast room according to an example embodiment.

FIG. 2 is a flow chart illustrating a method for interactions in a live broadcast room according to an example embodiment. As illustrated in FIG. 2, the method for interactions in a live broadcast room may be applied to an anchor client. That is, the method for interactions in a live broadcast room according to the embodiment of the disclosure may be described at the anchor client side. The method may include the following steps.

At S21, a question interaction function is opened in the live broadcast room.

It should be noted that the disclosure provides the anchor with a question interaction function in the live broadcast room. A button for the question interaction function in the live broadcast room may be set on the anchor client. The anchor may open the question interaction function in the live broadcast room through the anchor client, so that the question interaction between the anchor and the audience in the live broadcast room may be achieved based on the question interaction function. In some embodiments of the disclosure, the question form of the question interaction function may include but is not limited to any one or more of a text question form, a voice question form, a video question form, and the like.

Figure 3:
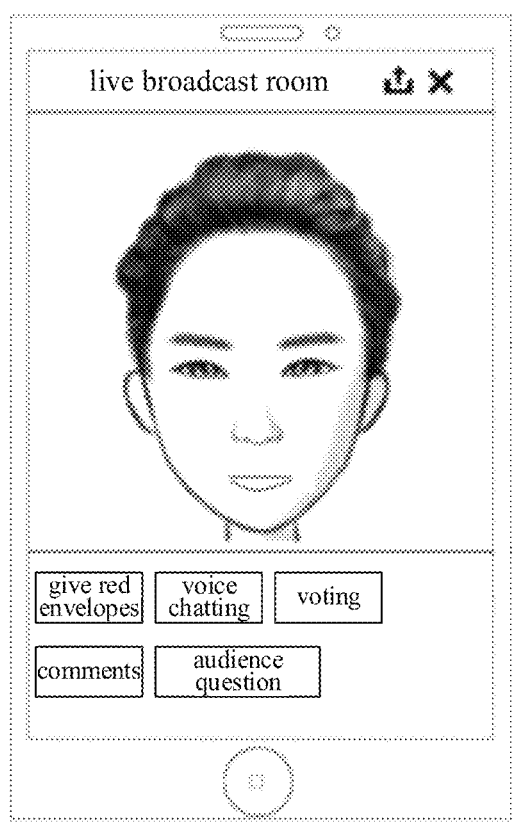
FIG. 3 is an exemplary diagram illustrating a display interface of an anchor client according to an example embodiment.

For example, a setting interface of the live broadcast room in the anchor client has a button set for the text question interaction function in the live broadcast room. As illustrated in FIG. 3, the "audience question" control is the button set for the text question interaction function in the live broadcast room. The anchor clicks this button to open the text question interaction function.

At S22, at least one piece of question information is obtained from a server and displayed in a first display area of the live broadcast room. In the embodiments of the disclosure, the at least one question piece of information is sent to the server by at least one audience client.

It should be noted that the anchor client and at least one audience client belong to the same live broadcast room. The at least one piece of question information includes a question that at least one user asks the anchor through their respective audience clients when the anchor opens the question interaction function. The question may be inputted by the user into the question input box of the panel interface in a third display area of his/her audience client. The question information including the question may be then forwarded by the server to the anchor client and other audience clients than the audience client in the live broadcast room for display. The at least one piece of question information may be then displayed in the first display area of the live broadcast room of the anchor client and other audience clients.

For example, after the anchor opens the text question interaction function in the live broadcast room through the anchor client, a question initiating control may be displayed in the clients of all audiences who are watching the live broadcast room. When the audience clicks the question initiating control, a panel interface is displayed in the audience client. The users may input the questions they want to ask the anchor on the panel interface. The audience client may send the question information inputted by the user to the server. The server sends the question information from the audience client to all the clients in the live broadcast room, including the anchor client and all the other audience clients, so that the anchor client may obtain the question information submitted by the audience clients from the server.

In order to allow the anchor to easily pay attention to the questions raised by the audience and avoid interference from other information unrelated to interactions with the anchor in the comment area, the first display area may be distinguished from the comments display area in the live broadcast room in some embodiments of the disclosure. Therefore, a new display area is set in the anchor client and the questions raised by the audiences are separately displayed in said new display area, so that the anchor may easily pay attention to the questions raised by the audiences and the interference from other information unrelated to interactions with the anchor in the comment area may be avoided.

At S23, an interaction parameter value corresponding to each piece of question information is obtained from the server.

In some embodiments of the disclosure, the interaction parameter value may include, but is not limited to, a number of thumbs-up, a number of votes, a number of virtual gifts given, a value of virtual gifts given, and the like.

It should be noted that, in the embodiments of the disclosure, the audience client displays the question information distributed by the server, and the question information displayed may include question information from its own audience client or question information from another audience clients. The audiences may give thumbs-up to the question information from its own audience client or question information from another audience clients, so that each piece of question information has a corresponding number of thumbs-up. It may be understood that if there is no thumbs-up from audiences for question information, it may be considered that a number of thumbs-up of the question information is zero. The server can count the number of thumbs-up corresponding to each piece of question information. The anchor client may obtain the number of thumbs-up corresponding to each piece of question information from the server.

At S24, a position of the question information in the first display area is adjusted based on the interaction parameter value corresponding to piece of question information.

For example, after the anchor client obtains the question information submitted by audience clients and the number of thumbs-up corresponding to each piece of question information from the server, the position of the question information in the first display area may be adjusted in a descending order of the numbers of thumbs-up corresponding to respective pieces of question information.

According to the method for interactions in a live broadcast room of the embodiment of the disclosure, at least one piece of question information may be obtained from the server and displayed in the first display area of the live broadcast room in response to the opening operation for the question interaction function in the live broadcast room, in which the at least one piece of question information is sent by at least one audience client to the server; the interaction parameter value corresponding to each piece of question information is obtained from the server, and the position of the question information in the first display area is adjusted based on the interaction parameter value corresponding to each piece of question information. Therefore, a new switch for the question interaction function is added on the anchor client, so that when the anchor opens the question interaction function, the audiences may ask the anchor through their respective clients, which provides the audiences with a new type of interaction with the anchor that supports the audience to ask questions. The anchor client intensively displays the questions asked by audiences in the first display area based on the interaction parameter value of question information, so that the anchor may easily notice the interaction questions raised by the audiences, thereby avoiding the interference of other information irrelevant to the anchor interaction in the comment area, facilitating to the interactions in the live broadcast room and improving the interaction atmosphere in the live broadcast room. In addition, a new interaction mode is added for the anchor and the audience, which may enrich the interaction mode between the anchor and the audience and satisfy diverse interaction appeals from users.

Figure 4:
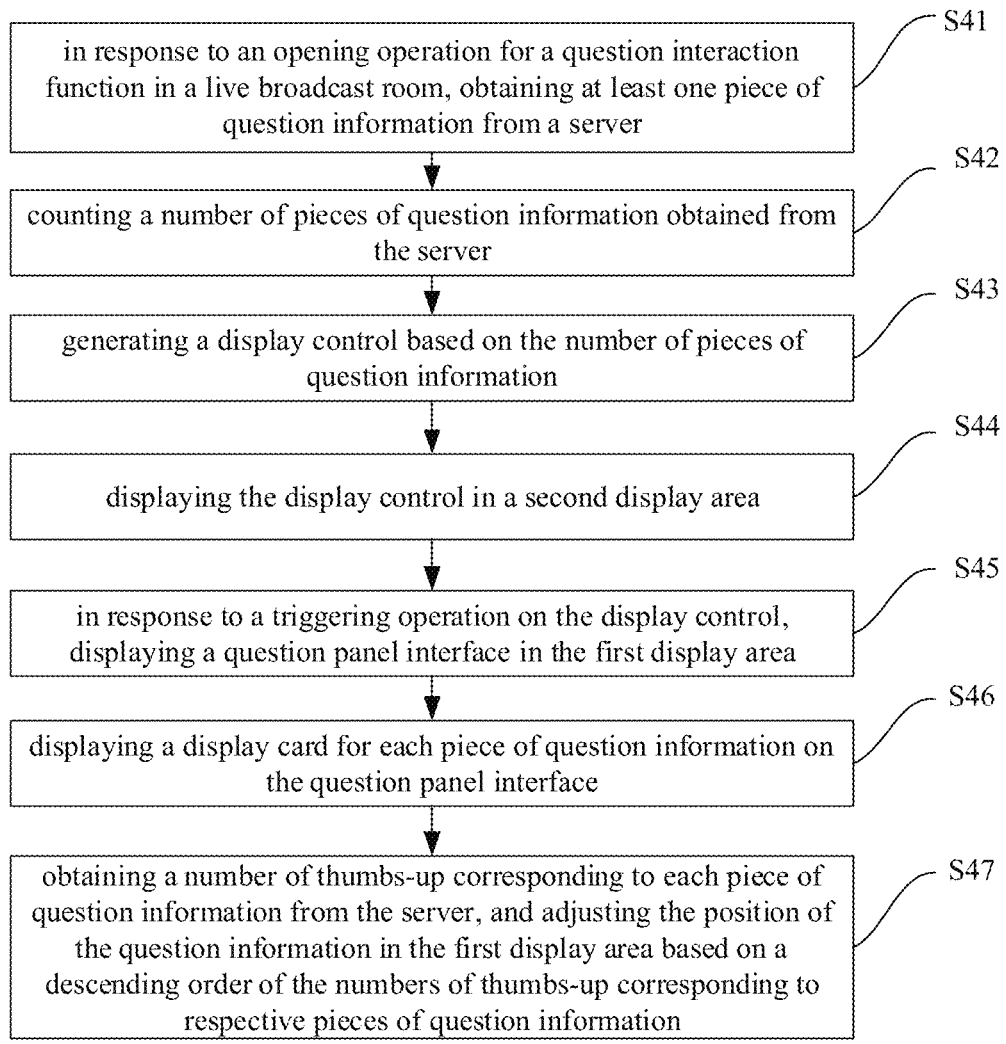
FIG. 4 is a flow chart illustrating another method for interactions in a live broadcast room according to an example embodiment.

FIG. 4 is a flow chart illustrating another method for interactions in a live broadcast room according to an example embodiment. As illustrated in FIG. 4, the method for interactions in a live broadcast room may include the following steps.

At S41, in response to an opening operation for a question interaction function in the live broadcast room, at least one piece of question information is obtained from a server.

In the embodiments of the disclosure, the at least one piece of question information is sent by at least one audience client to the server.

At S42, a number of pieces of question information obtained from the server is counted.

At S43, a display control is generated based on the number of pieces of question information.

The number of pieces of question information may be understood as the total number of pieces of question information submitted by all audiences in the live broadcast room. After the number of pieces of question information is obtained, a display control may be generated based on the number of pieces of question information. The text content in the display control may include the total number of pieces of question information.

At S44, the display control is displayed in a second display area. The second display area is different from the first display area and the comments display area.

Figure 5:
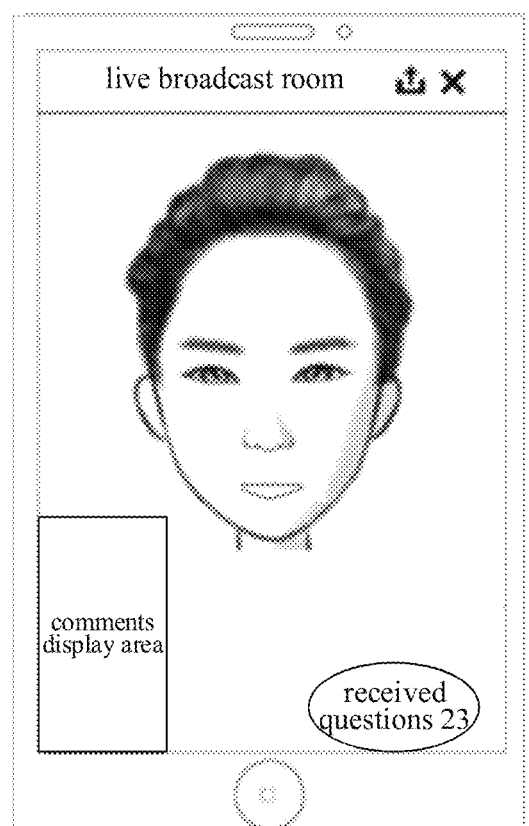
FIG. 5 is a schematic diagram illustrating a display control according to an example embodiment.

For example, assuming that the total number of questions submitted by all audiences in the live broadcast room may be 23, a display control may be generated. For example, as illustrated in FIG. 5, the display control may be displayed in the second display area on the anchor client and the text content within the display control may be "received questions 23". The number in the text content may indicate the total number of questions submitted by all audiences in the live broadcast room. It may be understood that, as illustrated in FIG. 5, the comments display area of the live broadcast room is located at the lower left corner area of the anchor client, and the second display area is different from the comments display area.

It should be noted that, in some embodiments of the disclosure, an adaptive function may be added to reduce the text font size, so as to prevent the text font within the display control from reaching the upper limit to obscure the comments display area.

At S45, in response to a trigger operation on the display control, a question panel interface is displayed in the first display area.

Figure 6:
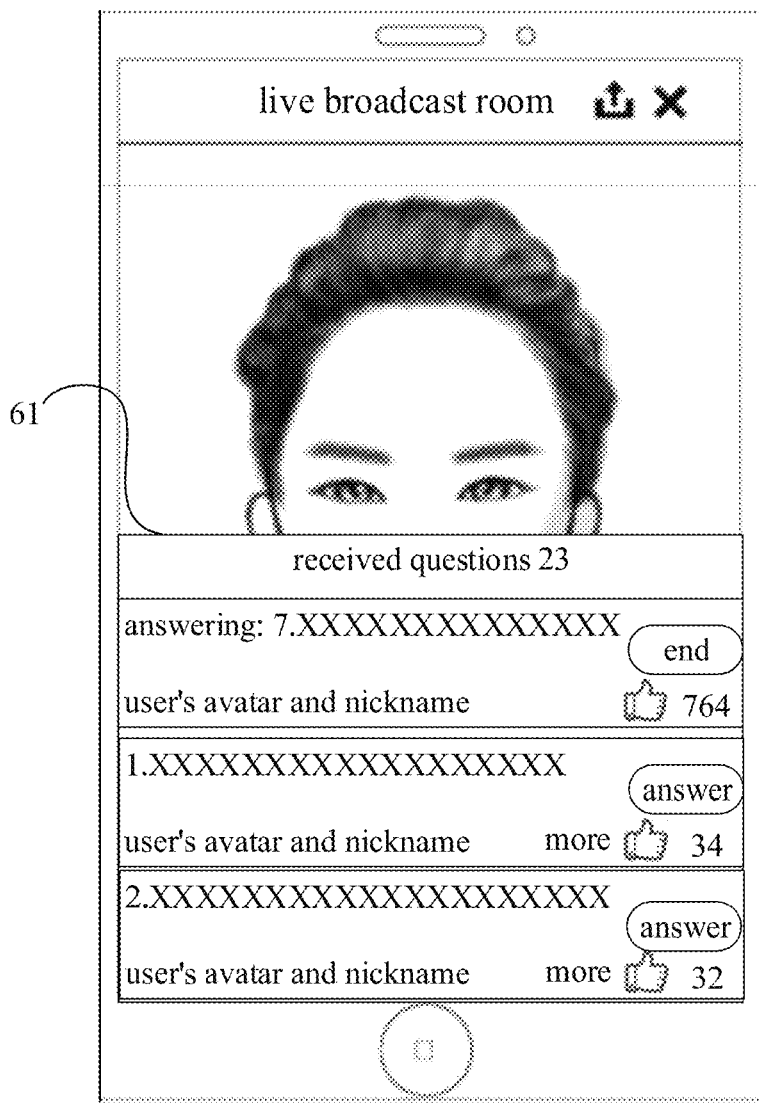
FIG. 6 is a schematic diagram illustrating a question panel interface according to an example embodiment.

In other words, when the anchor clicks on the display control, the anchor client may display the question panel interface in the first display area. For example, when the anchor clicks on the display control "received questions 23" as illustrated in FIG. 5, the anchor client unfolds the question panel interface 61 and displays it in the first display area. The first display area may be understood as a lower half screen area of the anchor client screen as illustrated in FIG. 6.

At S46, a display card for each piece of question information is displayed on the question panel interface.

In some embodiments of the disclosure, the display card for each piece of question information may be generated based on the text content of each piece of question information and a preset question display template. The display card for each piece of question information is then displayed on the question panel interface.

The display template is configured to define a display format of the text content of question information, and the display card contains the text content of question information in the display format.

That is, when the anchor client renders and displays the question information obtained from the server, the display card for each piece of question information may be generated based on the text content for each piece of question information and the preset question display template. For example, as illustrated in FIG. 6, each piece of question information corresponds to a display card, that is, the question information is displayed via the display card.

At S47, a number of thumbs-up corresponding to each piece of question information is obtained from the server, and the position of the question information in the first display area is adjusted in a descending order of the numbers of thumbs-up corresponding to respective pieces of question information.

For example, as illustrated in FIG. 6, after obtaining the display card of each piece of question information, the display card of each piece of question information may be displayed on the question panel interface based on the descending order of the number of thumbs-up corresponding to respective pieces of question information. That is, the display card with the maximum number of thumbs-up may be displayed at the top for the anchor to see.

It should be noted that, in some embodiments of the disclosure, as illustrated in FIG. 6, there are an avatar and nickname of the audience who submits the question information on each display card. When the anchor clicks on the avatar or nickname, a personal card of the audience may pop up which may include personal information such as gender and region information. There may be also the number of thumbs-up for the question information on each display card. In addition, there is also a "more" control on each display card. When the anchor clicks on the "more" control, a "question closing" function and a "reporting" function may be provided with the anchor. In other words, the anchor may close the question that he/she doesn't want to answer through the "question closing" function, and may also report the issues that do not comply with the live broadcast room specifications through the "reporting" function. Therefore, it is convenient for the anchor to manage the question information on the question panel interface by adding interaction management controls to the display card.

In order to make the audiences in the live broadcast room more intuitively know the question information that the anchor is currently answering, in some embodiments of the disclosure, the display card further includes an answer control. In the embodiments of the disclosure, after the display card of each piece of question information is displayed on the question panel interface, it may also display a target display card on top of remaining display cards on the question panel interface in response to a triggering operation on the answer control in the selected target display card by the anchor.

For example, as illustrated in FIG. 6, the display card may also include an answer control. The anchor may select the question information she/he wants to answer for answering. When the anchor client receives the triggering operation on the answer control in the target display card by the anchor, the target display card may be displayed on top of the remaining display cards on the question panel interface.

In some embodiments of the disclosure, while the target display card is displayed on top of the remaining display cards on the question panel interface, a state of the target question information for the target display card may be updated to an answering state, and the answer control in the target display card may be replaced with an end control. In response to a triggering operation on the end control in the target display card, the state of the target question information for the target display card is updated to a closed state and the target display card is removed from the question panel interface.

For example, as illustrated in FIG. 6, while the target display card is placed on top of the remaining display cards on the question panel interface, the state of the target question information for the target display card needs to be updated to the answering state, and the answer control in the target display card is replaced with the end control. When the anchor has answered the target question information, he/she may click the end control in the target display card to close the target question information. At this time, the target display card may be removed from the question panel interface.

In order to achieve consistency in displaying the questions on the anchor side and the audience side in the live broadcast room, in some embodiments of the disclosure, after the state of the target question information for the target display card is updated to the answering state, the answering state of the target question information is sent to the server, wherein the server sends the answering state of the target question information to all audience clients where the live broadcast room is watched, so that all the audience clients where the live broadcast room is watched find the target question information from a question list. The state of the target question information is updated to the answering state, the target question information is displayed on top of the question list.

Figure 7:
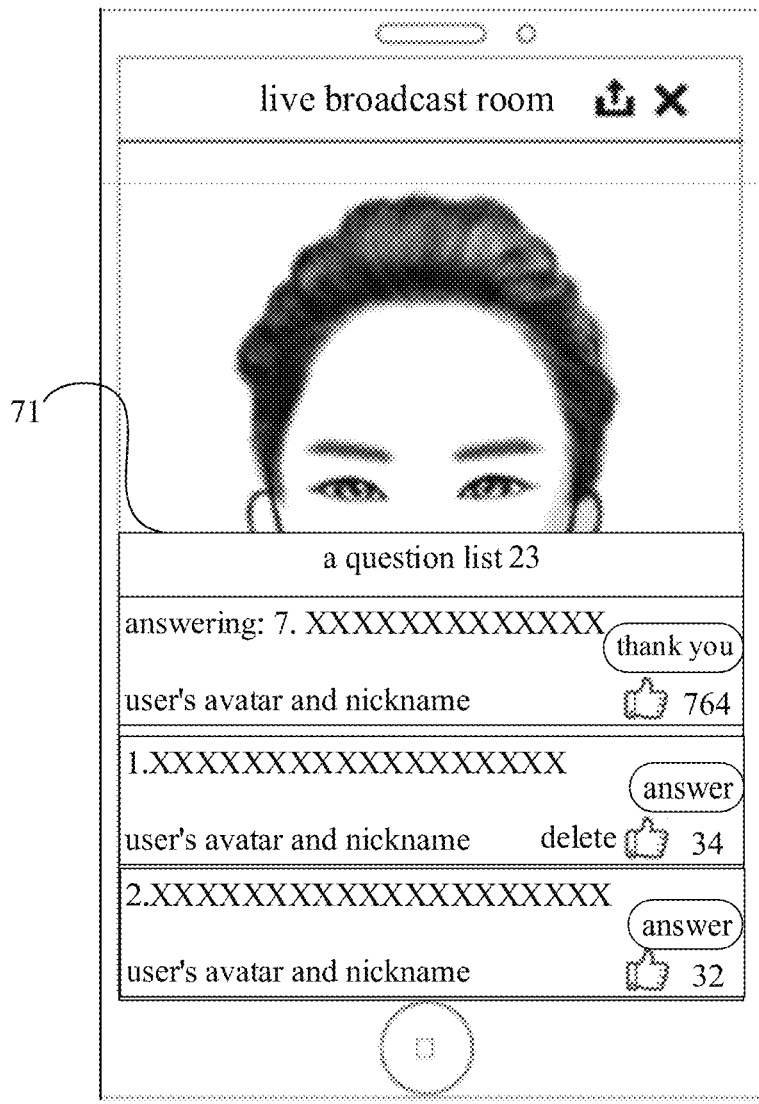
FIG. 7 is a schematic diagram illustrating a question list in an audience client according to an example embodiment.

That is, when the anchor selects to answer the target question information, the anchor audience client may send the answering state of the target question information to the server after the state of the target question information in the question panel interface is updated to the answering state. The server sends the answering state of the target question information to all the audience clients where the live broadcast room is watched, so that all the audience clients where the live broadcast room is watched display the target question information on top of the question list while the state of the target question information is updated to the answering state. For example, as illustrated in FIG. 6 and FIG. 7, the anchor chooses to answer the question information with the sequence number 7. The anchor client may update the state of the question information with the sequence number 7 to the answering state, display said question information at the top at the same time and send the answering state of the question information with the sequence number 7 to the server. The server sends the answering state of the question information to all the audience clients where the live broadcast room is watched in a pass-through manner, so that all the audience clients where the live broadcast room is watched display the target question information on top of the question list 71 while the state of the target question information is updated to the answering state. Therefore, the answering question information by the anchor is displayed on the anchor side and the audience side in a pass-through display manner, so that the anchor and the audiences may see the currently answering question information at the same time, which facilitates the interactions between the anchor and the audiences.

In order to further enhance an interaction atmosphere in the live broadcast room and ensure that the questioning information may be continued under special circumstances, in some embodiments of the disclosure, in response to the live broadcast room being non-subjectively closed, the timing is started. When a time period from the non-subjective closing of the live broadcast room to the reopening of the live broadcast room is less than a target threshold, an obtaining request is sent to the server. The obtaining request is configured to instruct the server to send remaining unanswered question information for the live broadcast room to the anchor client. The non-subjective closing of the live broadcast room may be understood as the fact that the live broadcast room is closed due to a disconnection or an instability of the network. For example, to prevent non-subjective behaviors such as a disconnection of the Internet, a 10-minute threshold may be set, and the question function may be reopened within 10 minutes and the question information may continue.

According to the method for interactions in a live broadcast room of the embodiments of the disclosure, in response to the opening operation for the question interaction function in the live broadcast room, at least one piece of question information may be obtained from the server and the display card for each piece of question information is generated based on the text content of each piece of question information and the preset question display template; then the display card for each piece of question information may be displayed on the question panel interface in the descending order of the numbers of thumbs-up corresponding to respective pieces of question information. Therefore, a new switch for the question interaction function is added on the anchor client, so that when the anchor opens the question interaction function, the audiences may ask the anchor through their respective clients, which provides the audience with a new type of interaction with the anchor that supports the audience to ask questions. The anchor client intensively displays the questions asked by audiences in the first display area based on the interaction parameter value of question information, so that the anchor may easily notice the interaction questions raised by audiences, thereby avoiding the interference of other information irrelevant to the anchor interaction in the comment area, facilitating to the interactions in the live broadcast room and improving the interaction atmosphere in the live broadcast room. In addition, a new interaction mode is added for the anchor and the audience, which may enrich the interaction mode between the anchor and the audience and satisfy diverse interaction appeals from users.

Figure 8:
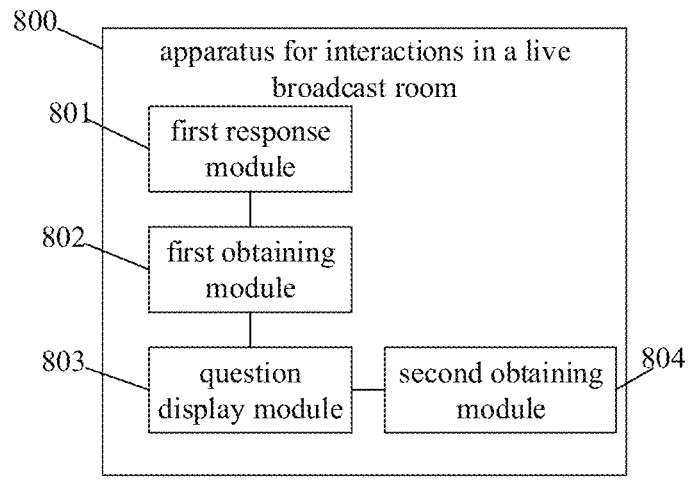
FIG. 8 is a block diagram illustrating an apparatus for interactions in a live broadcast room according to an example embodiment.

FIG. 8 is a block diagram illustrating an apparatus for interactions in a live broadcast room according to an example embodiment. It should be noted that the apparatus for interactions in a live broadcast room according to the embodiments of the disclosure may be applied to an anchor client. As illustrated in FIG. 8, the apparatus 800 for interactions in a live broadcast room may include: a first response module 801, a first obtaining module 802, a question display module 803 and a second obtaining module 804.

Specifically, the first response module 801 is configured to respond to an opening operation for a question interaction function in the live broadcast room. In some embodiments of the disclosure, the question form of the question interaction function may include, but is not limited to, any one or more of a text question form, a voice question form, a video question form, and the like.

The first obtaining module 802 is configured to obtain at least one piece of question information from a server. The at least one piece of question information is sent by at least one audience client to the server.

The question display module 803 is configured to display the at least one piece of question information in a first display area of the live broadcast room.

The second obtaining module 804 is configured to obtain an interaction parameter value corresponding to each piece of question information from the server. In some embodiments of the disclosure, the interaction parameter value may include, but is not limited to, a number of thumbs-up.

The question display module 802 is further configured to adjust a position of the question information in the first display area based on the interaction parameter value corresponding to each piece of question information. In some embodiments of the disclosure, the question display module 802 may adjust the position of the question information in the first display area based on a descending order of the number of thumbs-up corresponding to respective pieces of question information.

Figure 9:
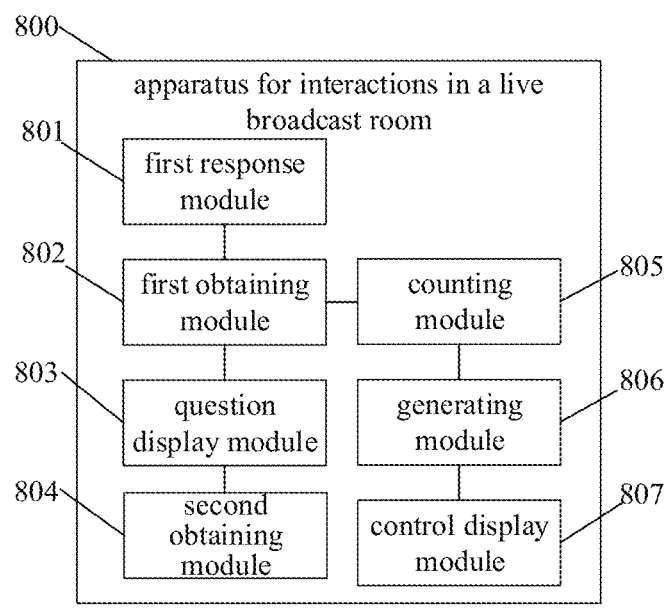
FIG. 9 is a block diagram illustrating another apparatus for interactions in a live broadcast room according to an example embodiment.

In some embodiments of the disclosure, as illustrated in FIG. 9, the apparatus 800 for interactions in a live broadcast room may further include: a counting module 805, a generating module 806, and a control display module 807. The counting module 804 is configured to count a number of pieces of question information obtained from a server after the first obtaining module 802 obtains at least one piece of question information from the server. The generating module 806 is configured to generate a display control based on the number of pieces of question information. The control display module 807 is configured to display the display control in a second display area.

In some embodiments of the disclosure, the question display module 803 may display a question panel interface in the first display area in response to a triggering operation on the display control; generating a display card for each piece of question information based on text content of each piece of question information and a preset question display template; and displaying the display card for each piece of question information on the question panel interface. The display template is configured to define a display format of the text content of the question information, and the display card includes the text content of the question information in the display format.

In some embodiments of the disclosure, the display card further includes an answer control. In the embodiments of the disclosure, the question display module 803 is further configured to display a target display card on top of remaining display cards on the question panel interface in response to a triggering operation on the answer control in the target display card.

Figure 10:
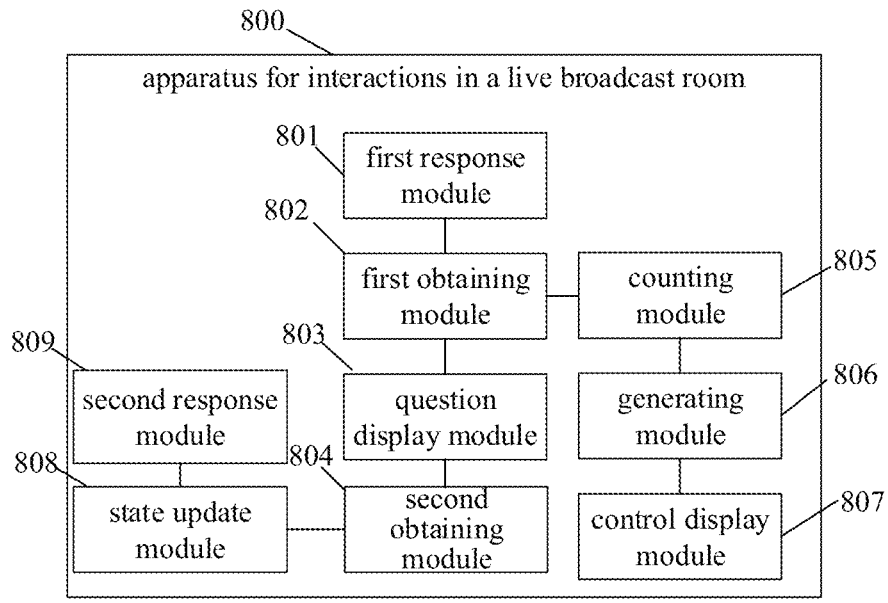
FIG. 10 is a block diagram illustrating yet another apparatus for interactions in a live broadcast room according to an example embodiment.

In some embodiments of the disclosure, as illustrated in FIG. 10, the apparatus 800 for interactions in a live broadcast room may further include: a state update module 808 and a second response module 809. The state update module 808 is configured to while the target display card is displayed on top of the remaining display cards on the question panel interface, update a state of the target question information for the target display card to an answering state and replace the answer control in the target display card with an end control. The second response module 809 is configured to in response to a triggering operation on the end control in the target display card, update the state of the target question information to a closed state, and remove the target display card from the question panel interface.

Figure 11:
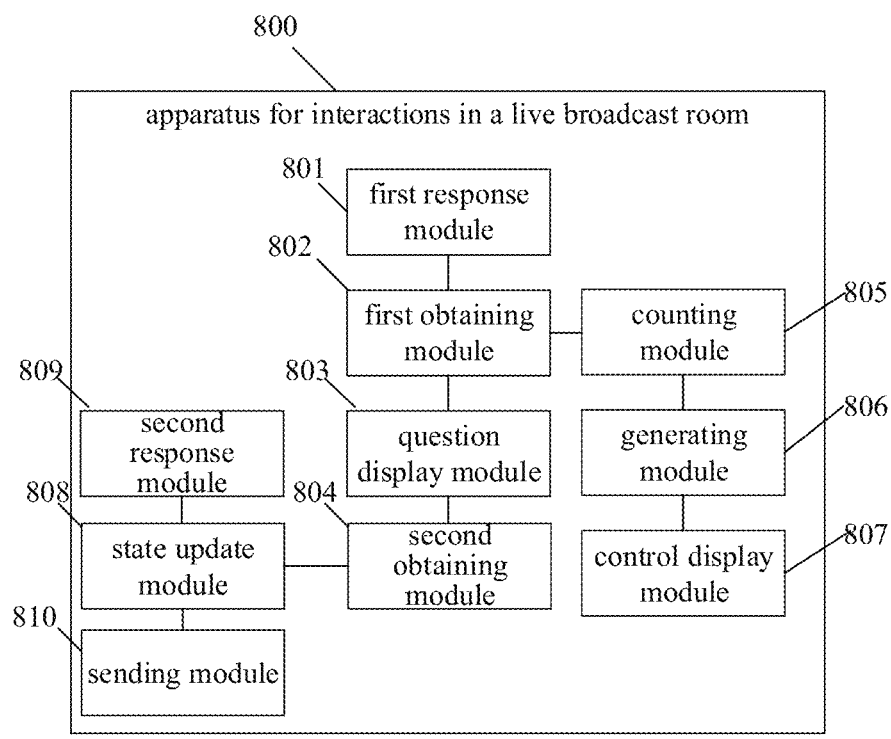
FIG. 11 is a block diagram illustrating yet another apparatus for interactions in a live broadcast room according to an example embodiment.

In some embodiments of the disclosure, as illustrated in FIG. 11, the apparatus 800 for interactions in a live broadcast room may further include: a sending module 810. The sending module 810 is configured to send the answering state of the target question information to the server after updating the state of the target question information for the target display card to the answering state, and display the target question information on top of a question list while updating the state of the target question information to the answering state. The server sends the answering state of the target question information to all the audience clients where the live broadcast room is watched, so that all the audience clients where the live broadcast room is watched find the target question information from a question list.

Figure 12:
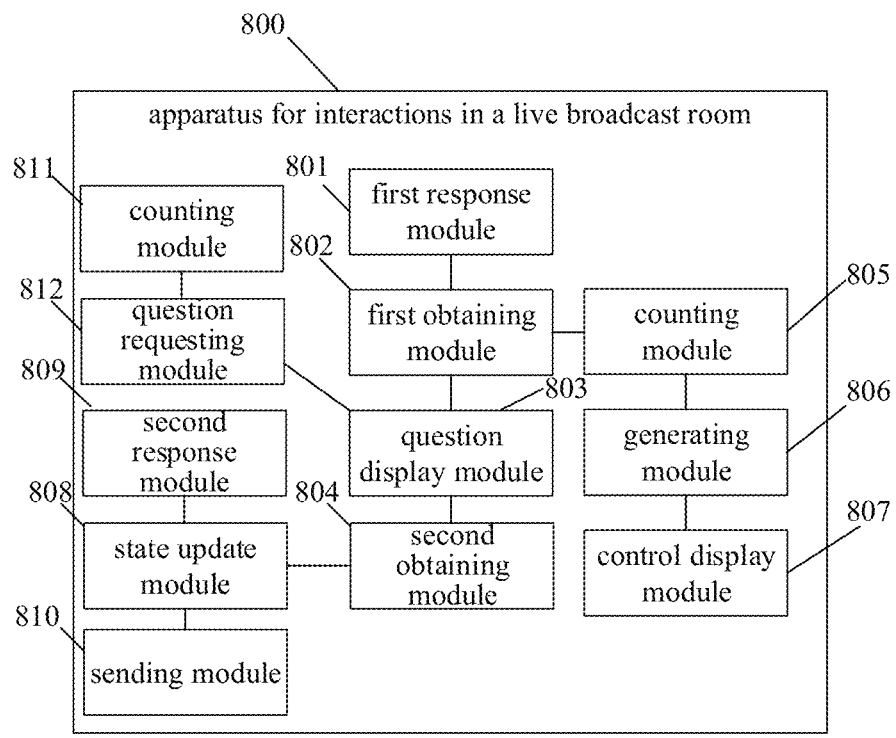
FIG. 12 is a block diagram illustrating yet another apparatus for interactions in a live broadcast room according to an example embodiment.

In some embodiments of the disclosure, as illustrated in FIG. 12, the apparatus 800 for interactions in a live broadcast room may further include: a timing module 811 and a question request module 812. The timing module 811 is configured to start timing in response to the live broadcast room being non-subjectively closed. The question requesting module 812 is configured to send an obtaining request to the server when a time period from the non-subjectively closing to a reopening of the live broadcast room is less than a target threshold. The obtaining request is configured to instruct the server to send remaining unanswered question information for the live broadcast room to the anchor client.

Regarding the apparatus in the above embodiments, the specific manners in which each module performs operation have been described in detail in the method embodiments, which will not be elaborated herein.

According to the apparatus for interactions in a live broadcast room in the embodiments of the disclosure, in response to the opening operation for the question interaction function in the live broadcast room, at least one piece of question information may be obtained from the server and displayed in the first display area of the live broadcast room, wherein the at least one piece of question information is sent by at least one audience client to the server; the interaction parameter value corresponding to each piece of question information is obtained from the server, and the position of the question information is adjusted in the first display area based on the interaction parameter value corresponding to each piece of question information. Therefore, a new switch for the question interaction function is added on the anchor client, so that when the anchor opens the question interaction function, the audience may ask the anchor through their respective clients, which provides the audiences with a new type of interaction with the anchor that supports the audience to ask questions. The anchor client intensively displays the questions asked by audiences in the first display area based on the interaction parameter value of question information, so that the anchor may easily notice the interaction questions raised by audiences, thereby avoiding the interference of other information irrelevant to the anchor interaction in the comment area, facilitating to the interactions in the live broadcast room and improving the interaction atmosphere in the live broadcast room. In addition, a new interaction mode is added for the anchor and the audience, which may enrich the interaction mode between the anchor and the audience and satisfy diverse interaction appeals from users.

Figure 13:
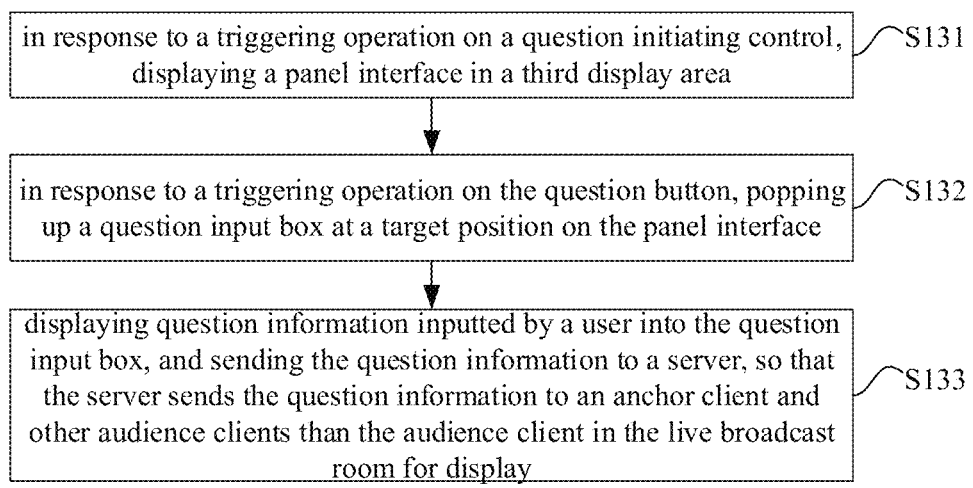
FIG. 13 is a flow chart illustrating another yet another method for interactions in a live broadcast room according to an example embodiment.

FIG. 13 is a flow chart illustrating another yet another method for interactions in a live broadcast room according to an example embodiment. As illustrated in FIG. 13, the method for interactions in a live broadcast room may be applied to an audience client. That is, the method for interactions in a live broadcast room in the embodiments of the disclosure may be described from the audience client. The method for interactions in a live broadcast room may include the following steps.

At S131, in response to a triggering operation on a question initiating control, a panel interface is displayed in a third display area.

In the embodiments of the disclosure, the question initiating control is generated after the question interaction function in the live broadcast room is opened. The panel interface includes a question button.

Figure 14:
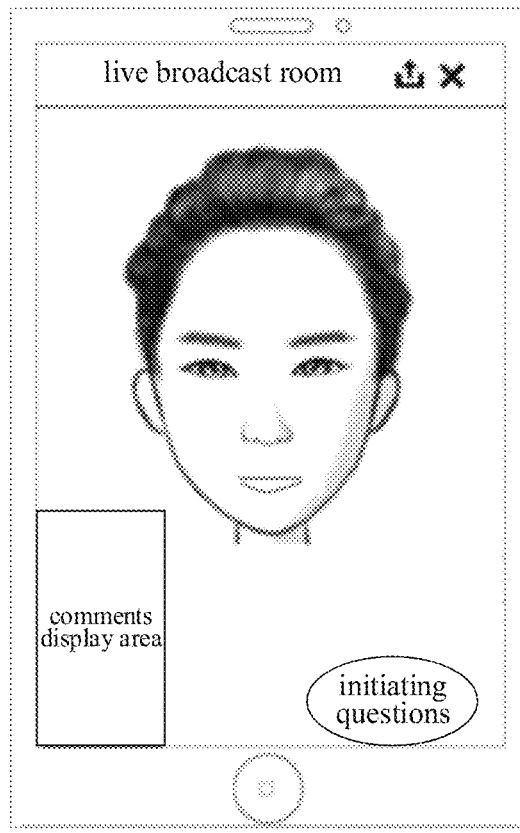
FIG. 14 is a schematic diagram illustrating a question initiating control according to an example embodiment.

For example, a setting interface of the live broadcast room in the anchor client has a setting button for the text question interaction function in the live broadcast room. As illustrated in FIG. 3, the "audience question" control is the setting button for the text question interaction function in the live broadcast room. The anchor clicks the button to open the text question interaction function in the live broadcast room. When the anchor opens the text question interaction function, the audience client may display a question initiating control in a fifth display area. For example, as illustrated in FIG. 14, the fifth display area where the question initiating control is located is different from a comments display area in the live broadcast room.

For example, when the audience clicks the question initiating control on the audience client, the panel interface may be displayed in the third display area. The third display area may be the lower half screen area of the audience client. For example, as illustrated in FIG. 7, a panel interface may pop up in the lower half of the screen area of the audience client when the audience clicks the question initiating control on the audience client. The question panel interface may include questions submitted by audiences in the live broadcast room and question buttons.

At S132, in response to a triggering operation on the question button, a question input box is popped up at the target position on the panel interface.

That is, the audience may click the question button in the question panel interface, and the text input box may pop up on the panel interface, so that the audience may input the question to be asked into the text input box.

At S133, question information inputted by a user into the question input box is displayed in the panel interface, and the question information is sent to the server, so that the server sends the question information to the anchor client and other audience clients than the audience client in the live broadcast room for display.

In the embodiments of the disclosure, text content of the question information inputted by the user into the text input box may be received, a corresponding display card is generated based on the text content of the question information and a preset question display template, and the display card is displayed in the panel interface. The display template is configured to define a display format of the text content of the question information, and the display card includes the text content of the question information in the display format. In other words, the audience client may render and display the question information to be displayed in the question panel interface through a display card. In order to ensure that all users in the live broadcast room may see the question information submitted by the questioner, the client may send the question information raised by the questioner to the server. The server sends the question information to the anchor client and other audience clients in the live broadcast room for display, so that the question information submitted by the audience may be simultaneously displayed on all the clients in the live broadcast room, and both the anchor and the audiences may see the question information raised by the questioner.

In some embodiments of the disclosure, the panel interface also includes a display card of question information initiated by other audiences through their respective audience clients, and the display card also includes interaction controls such as a thumbs-up control. In the embodiment of the disclosure, the interaction parameter value corresponding to each piece of question information displayed in the panel interface may be obtained from the server. The interaction parameter value is obtained by the server counting a number of triggering the interaction control on the display card. A display position of the display card of the question information is adjusted in the panel interface based on the interaction parameter value corresponding to each piece of question information. For example, the audience may give thumbs-up to the questions asked by themselves and other audiences. In this way, the audience client may rank the display order of all questions in the panel interface based on the number of thumbs-up. For example, the question with a large number of thumbs-up may be displayed behind the question with a small number of thumbs-up.

In some embodiments of the disclosure, the state of the answering question information sent by the anchor client may be obtained from the server, a target display card for the answering question information is found from the panel interface based on the state of the answering question information sent by the anchor client, and the target display card is then displayed on top of the remaining display cards on the panel interface. For example, as illustrated in FIG. 7, when the anchor may choose the question information that he/she wants to answer for answering, the server may receive the answering state of the question information sent by the anchor client, and send the answering state of the question information to the audience clients. After receiving the state of the question information that the anchor is answering sent by the server, the audience client may find the target display card for the question information that the anchor is answering from the panel interface, and display the target display card on top of the remaining display cards on the panel interface.

In some embodiments of the disclosure, while the target display card is displayed on top of the remaining display cards, the state of the question information for the target display card is updated to the answering state, and a thank you control is displayed in a target area inside the target display card, and in response to the audience's triggering operation on the thank you control, a gift panel pops up. For example, as illustrated in FIG. 7, while the target display card is displayed on top of the remaining display card on the panel interface, the state of the target question information is changed to the answering state, and the thank you control is displayed in the target area inside the target display card. When the audience clicks the thank you control, the gift panel may pop up so that the audiences may purchase gifts on the gift panel to thank the anchor.

In some embodiments of the disclosure, in response to the audience's folding operation on the panel interface, the panel interface is hidden, the question that the anchor is currently answering is determined, and an answering widget is generated based on the question information that the anchor is currently answering and a preset generation template, in which the answering widget includes text content of the question information that the anchor is currently answering; and the answering widget is displayed in a fourth display area, in which the fourth display area is different from the third display area, the fifth display area and the comments display area.

Figure 15:
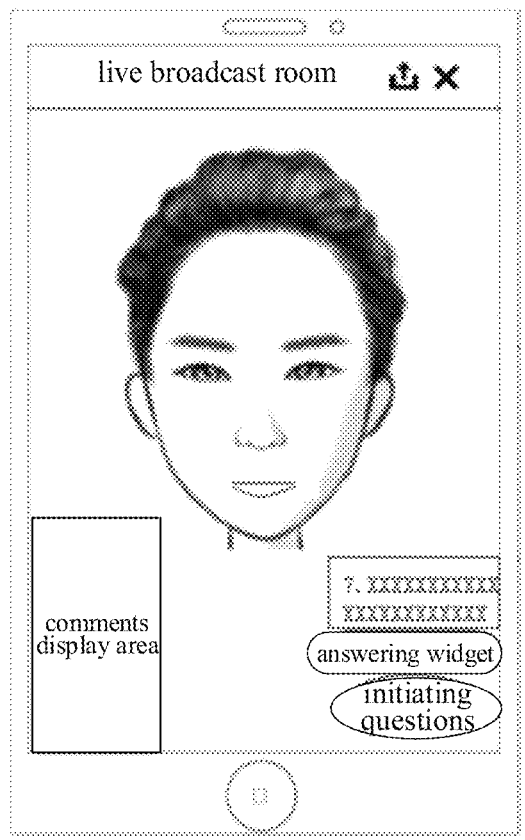
FIG. 15 is a schematic diagram illustrating an answering widget according to an example embodiment.

For example, when the audience clicks on a region of the client except for the panel interface, the client can hide the panel interface. At this time, the question information that the anchor is currently answering may be determined, and the answering widget is generated based on the question information that the anchor is currently answering and the preset generation template. For example, as illustrated in FIG. 15, the answering widget includes the text content of the question information that the anchor is currently answering. The answering widget is displayed in the fourth display area which is different from the third display area, the fifth display area and the comments display area. For example, the fourth display area may be located above the fifth display area.

It should be noted that, in some embodiments of the disclosure, as illustrated in FIG. 7, the question information submitted by the audiences may be permanently displayed at the bottom of the panel interface. When there are multiple pieces of question information raised by the audience, the top piece of question information may be displayed at the bottom of the panel interface. Optionally, the frequency of asking a question by each audience needs to be limited. For example, only y questions may be sent out in x minutes. When the audience asks questions too frequently, it may prompt "You ask too frequently, please try again in x minutes". It should be also explained that, a number of words of questions submitted by the audience may be limited to a certain number, for example, it is limited that the number of words of a question does not exceed 30.

According to the method for interactions in a live broadcast room in the embodiments of the disclosure, in response to the triggering operation on the control, the panel interface may be displayed in the third display area, in which the question panel interface includes a question button; in response to the triggering operation on the question button by the first audience, the question input box pops up at the target position on the panel interface, and the question information inputted into the question input box by the users is displayed in the panel interface and the question information is sent to the server, so that the server may send the question information to the anchor client and other audience clients in the live broadcast room for display. Therefore, a new switch for the question interaction function is added on the anchor client, so that when the anchor opens the question interaction function, the audiences may ask the anchor through their respective clients, which provides the audience with a new type of interaction with the anchor that supports the audience to ask questions. The anchor client intensively displays the questions asked by audiences in the first display area based on the interaction parameter value of question information, so that the anchor may easily notice the interaction questions raised by audiences, thereby avoiding the interference of other information irrelevant to the anchor interaction in the comment area, facilitating to the interactions in the live broadcast room and improving the interaction atmosphere in the live broadcast room. In addition, a new interaction mode is added for the anchor and the audience, which may enrich the interaction mode between the anchor and the audience and satisfy diverse interaction appeals from users.

Figure 16:
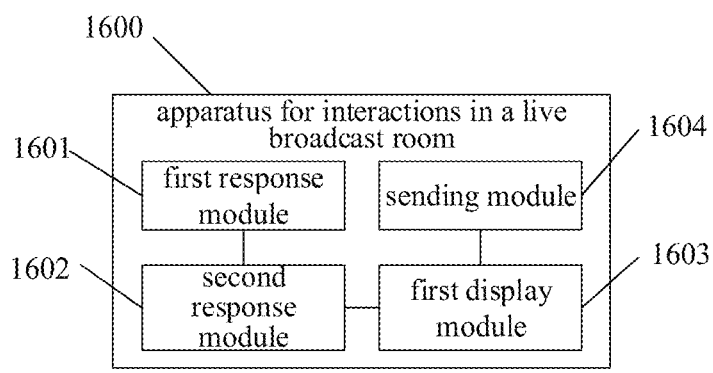
FIG. 16 is a block diagram illustrating an apparatus for interactions in a live broadcast room according to an example embodiment.

FIG. 16 is a block diagram illustrating an apparatus for interactions in a live broadcast room according to an example embodiment. It should be noted that the apparatus for interactions in a live broadcast room in the embodiments of the disclosure may be applied to a first audience client. Referring to FIG. 16, the apparatus 1600 for interactions in a live broadcast room includes: a first response module 1601, a second response module 1602, a first display module 1603, and a sending module 1604.

The first response module 1601 is configured to display a panel interface in a third display area in response to a triggering operation on a control. The control is generated after a question interaction function in the live broadcast room is opened, and the panel interface includes a question button.

The second response module 1602 is configured to pop up a question input box at the target position on the panel interface in response to a triggering operation on the question button.

The first display module 1603 is configured to display question information inputted by a user into the question input box in the panel interface. As an example, the first display module 1603 is specifically configured to: receive text content of the question information inputted into the question input box; generate a corresponding display card based on the text content of the question information and a preset question display template, in which the display template is configured to define a display format of the text content of the question information, and the display card includes the text content of the question information in the display format; and display the display card in the panel interface.

The question sending module 1604 is configured to send the question information to the server, so that the server sends the question information to an anchor client and other audience clients than the audience client in the live broadcast room for display.

Figure 17:
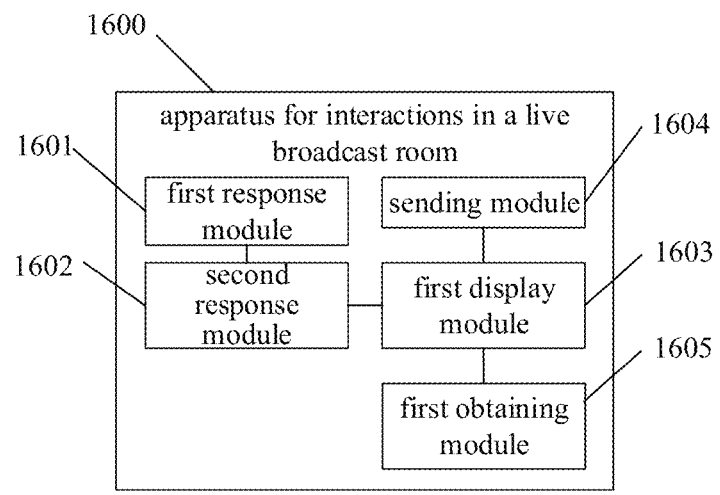
FIG. 17 is a block diagram illustrating another apparatus for interactions in a live broadcast room according to an example embodiment.

In some embodiments of the disclosure, the panel interface also includes display cards of the question information initiated by other audience clients, and the display card also includes interaction controls. In the embodiments of the disclosure, as illustrated in FIG. 17, the apparatus for interactions in a live broadcast room 1600 may further include: a first obtaining module 1605. The first obtaining module 1605 is configured to obtain the interaction parameter value corresponding to each piece of question information from the server. The interaction parameter value is obtained by the server counting a number of triggering the interaction control on the display card. The first display module 1603 is further configured to adjust a display position of the display card of the question information in the panel interface based on the interaction parameter value corresponding to each piece of question information.

Figure 18:
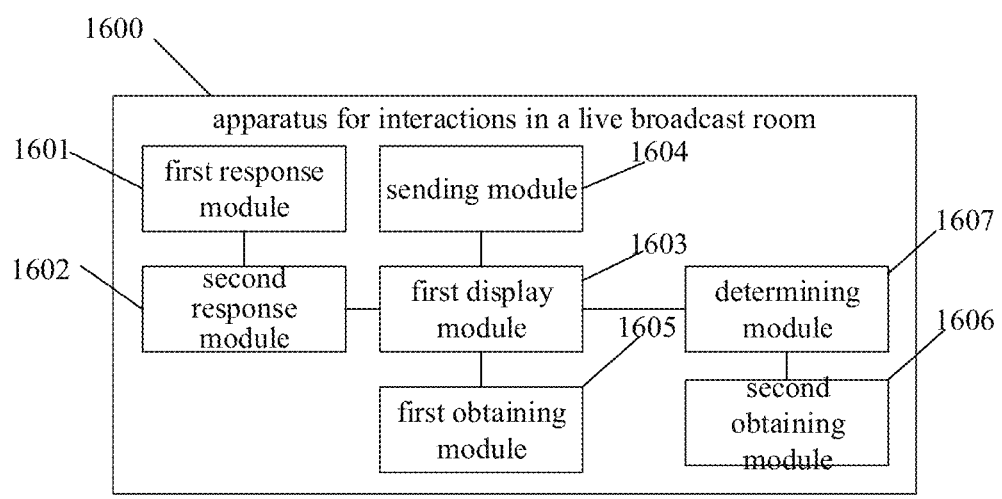
FIG. 18 is a block diagram illustrating yet another apparatus for interactions in a live broadcast room according to an example embodiment.

In some embodiments of the disclosure, as illustrated in FIG. 18, the apparatus for interactions in a live broadcast room 1600 may further include: a second obtaining module 1606 and a determining module 1607. The second obtaining module 1606 is configured to obtain the state of the answering question information sent by the anchor client from the server. The determining module 1607 is configured to find a target display card for the answering question information from the panel interface based on the state of the answering question information sent by the anchor client. In the embodiment of the disclosure, the first display module 1603 is further configured to display the target display card on top of the remaining display cards on the panel interface.

Figure 19:
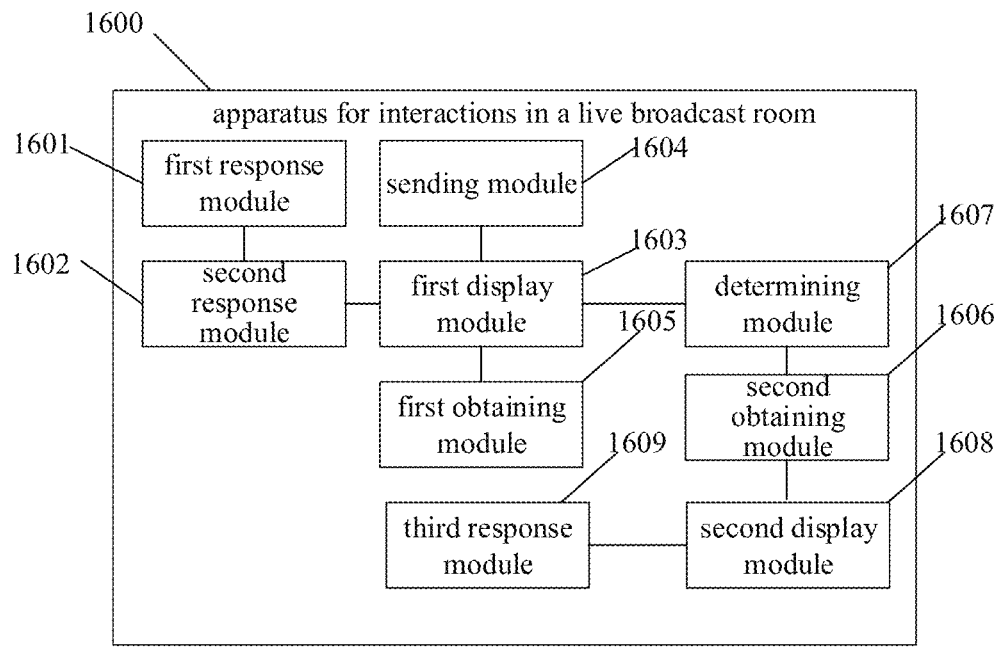
FIG. 19 is a block diagram illustrating yet another apparatus for interactions in a live broadcast room according to an example embodiment.

In some embodiments of the disclosure, as illustrated in FIG. 19, the apparatus for interactions in a live broadcast room 1600 may further include: a second display module 1608 and a third response module 1609. The second display module 1608 is configured to update the state of the question information for the target display card to the answering state, and display a thank you control in a target area of the target display card. The third response module 1609 is configured to pop up a gift panel in response to a triggering operation on the thank you control.

Figure 20:
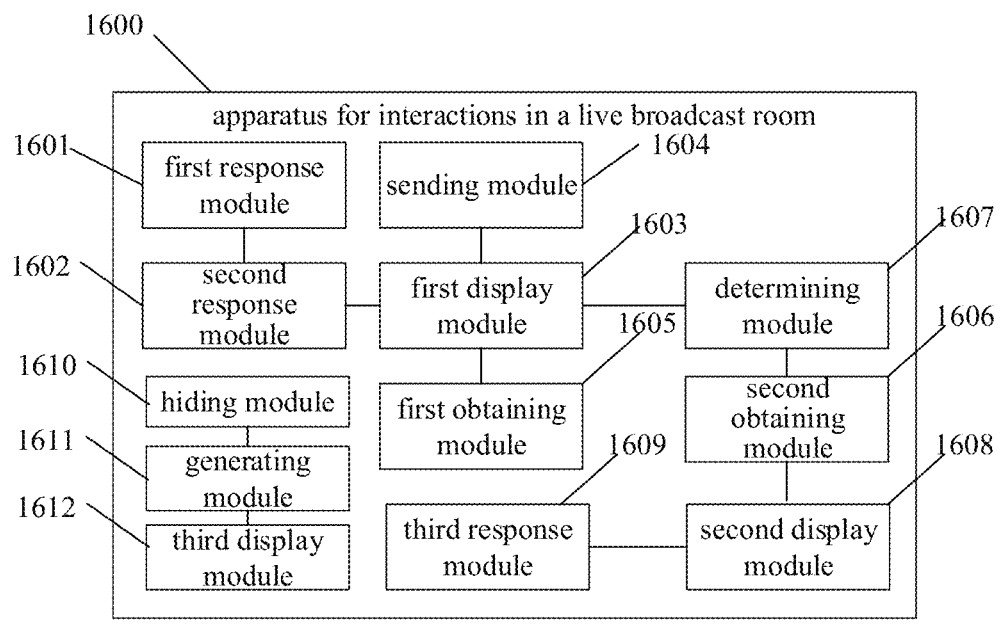
FIG. 20 is a block diagram illustrating yet another apparatus for interactions in a live broadcast room according to an example embodiment.

In some embodiments of the disclosure, as illustrated in FIG. 20, the apparatus for interactions in a live broadcast room 1600 may further include: a hiding module 1610, a generating module 1611, and a third display module 1612. The hiding module 1610 is configured to hide the panel interface in response to a folding operation on the panel interface. The generating module 1611 is configured to determine the answering question information by the anchor client, and generate an answering widget based on the answering question information and a preset generation template. The answering widget includes text content of the answering question information. The third display module 1612 is configured to display the answering widget in a fourth display area.

Regarding the apparatus in the above embodiments, the specific manners in which each module performs operation have been described in detail in the method embodiments, which will not be elaborated herein.

According to the apparatus for interactions in a live broadcast room in the embodiments of the disclosure, in response to the triggering operation on the question initiating control, the panel interface is displayed in the third display area, in which the question panel interface includes a question button; in response to the triggering operation on the question button, pop up a question input box at the target position on the panel interface, and the question information inputted by the user into the question input box is displayed in the panel interface and the question information is sent to the server, so that the server may send the question information to the anchor client and other audience clients in the live broadcast room for display. Therefore, a new switch for the question interaction function is added on the anchor client, so that when the anchor opens the question interaction function, the audiences may ask the anchor through their respective clients, which provides the audiences with a new type of interaction with the anchor that supports the audience to ask questions. The anchor client intensively displays the questions asked by audiences in the first display area based on the interaction parameter value of question information, so that the anchor may easily notice the interaction questions raised by audiences, thereby avoiding the interference of other information irrelevant to the anchor interaction in the comment area, facilitating to the interactions in the live broadcast room and improving the interaction atmosphere in the live broadcast room. In addition, a new interaction mode is added for the anchor and the audience, which may enrich the interaction mode between the anchor and the audience and satisfy diverse interaction appeals from users.

Figure 21:
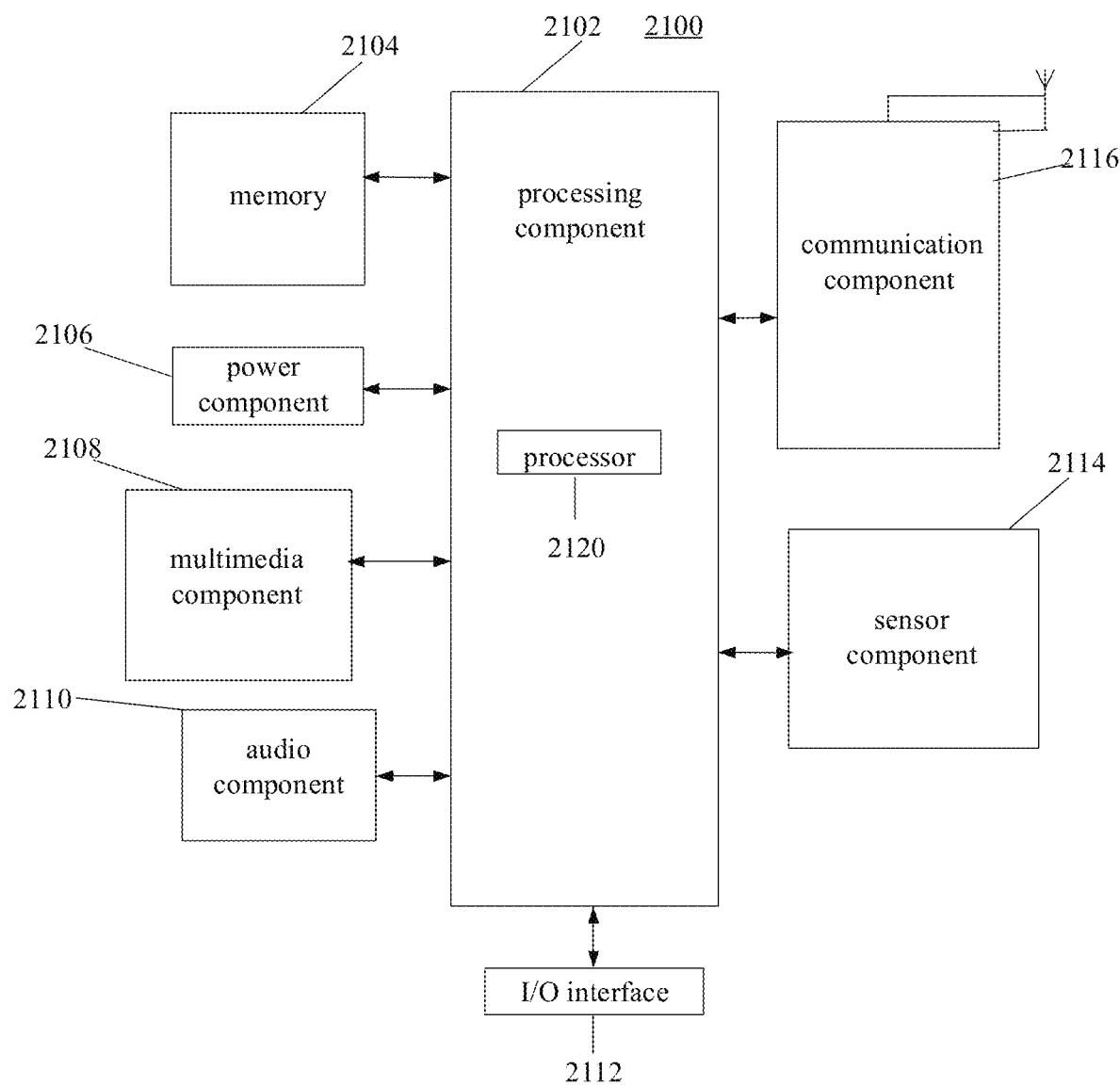
FIG. 21 is a block diagram illustrating an electronic device according to an example embodiment.

In order to implement the above-mentioned embodiment, the disclosure also provides an electronic device. FIG. 21 is a block diagram illustrating an electronic device 2100 according to an example embodiment. For example, the electronic device 2100 may be a mobile phone, a computer, a digital broadcasting terminal, a messaging device, a game console, a tablet device, a medical device, a fitness device, a personal digital assistant, and so on.

Referring to FIG. 21, the electronic device 2100 may include one or more of the following components: a processing component 2102, a memory 2104, a power supply component 2106, a multimedia component 2108, an audio component 2110, an input/output (I/O) interface 2112, and a sensor component 2114, and a communication component 2116.

The processing component 2102 typically controls the overall operations of the electronic device 2100, such as the operations associated with display, telephone calls, data communications, camera operations, and recording operations. The processing component 2102 may include one or more processors 2120 to execute instructions to perform all or part of the steps of the above described method. In addition, the processing component 2102 may include one or more modules which facilitate the interaction between the processing component 2102 and other components. For example, the processing component 2102 may include a multimedia module which facilitates the interaction between the multimedia component 2108 and the processing component 2102.

The memory 2104 is configured to store various types of data to support operations in the electronic device 2100. Examples of such data include instructions for any application or method operating on the electronic device 2100, contact data, phone book data, messages, pictures, videos, etc. The memory 2104 may be implemented by any type of volatile or non-volatile storage device or a combination thereof, such as a static random access memory (SRAM), an electrically erasable programmable read-only memory (EEPROM), an erasable programmable read only memory (EPROM), a programmable read only memory (PROM), a read only memory (ROM), a magnetic memory, a flash memory, a magnetic or optical disk.

The power supply component 2106 provides power for various components of the electronic device 2100. The power supply component 2106 may include a power management system, one or more power sources, and other components associated with the generation, management, and distribution of power for the electronic device 2100.

The multimedia component 2108 includes a touch screen that provides an output interface between the electronic device 2100 and the user. In some embodiments, the touch display screen may include a liquid crystal display (LCD) and a touch panel (TP). The touch panel includes one or more touch sensors to sense touches, swipes, and gestures on the touch panel. The touch sensor may not only sense a boundary of a touch or slide action, but also sense a period of time and a pressure associated with the touch or slide action. In some embodiments, the multimedia component 2108 includes a front camera and/or a rear camera. When the electronic device 2100 is in an operation mode, such as a shooting mode or a video mode, the front camera and/or the rear camera may receive external multimedia data. Each of the front camera and rear camera may be a fixed optical lens system or have a focal length and optical zoom capabilities.

The audio component 2110 is configured to output and/or input audio signals. For example, the audio component 2110 includes a microphone (MIC) configured to receive an external audio signal when the electronic device 2100 is in an operation mode, such as a call mode, a recording mode, and a voice recognition mode. The received audio signal may be further stored in the memory 2104 or transmitted via the communication component 2116. In some embodiments, the audio component 2110 further includes a speaker for outputting audio signals.

The I/O interface 2112 provides an interface between the processing component 2102 and a peripheral interface module. The above-mentioned peripheral interface module may be a keyboard, a click wheel, a button, and the like. These buttons may include, but are not limited to: a home button, a volume button, a starting button, and a locking button.

The sensor component 2114 includes one or more sensors for providing the electronic device 2100 with various aspects of state evaluation. For example, the sensor component 2114 may detect an open/closed state of the electronic device 2100, relative positioning of components, e.g., the display and the keypad of the electronic device 2100, a change in position of the electronic device 2100 or a component of the electronic device 2100, a presence or absence of user contact with the electronic device 2100, an orientation or an acceleration/deceleration of the electronic device 2100, and a change in temperature of the electronic device 2100. The sensor component 2114 may include a proximity sensor configured to detect the presence of nearby objects without any physical contact. The sensor component 2114 may also include a light sensor, such as a CMOS or CCD image sensor, for use in imaging applications. In some embodiments, the sensor component 2114 may also include an acceleration sensor, a gyroscope sensor, a magnetic sensor, a pressure sensor, or a temperature sensor.

The communication component 2116 is configured to facilitate wired or wireless communication between the electronic device 2100 and other devices. The electronic device 2100 may access a wireless network based on a communication standard, such as WiFi, 2G; or 3G; or a combination thereof. In an exemplary embodiment, the communication component 2116 receives a broadcast signal or broadcast associated information from an external broadcast management system via a broadcast channel. In an exemplary embodiment, the communication component 2116 further includes a near field communication (NFC) module to facilitate short-range communication. For example, the NFC module may be implemented based on a radio frequency identification (RFID) technology, an infrared data association (IrDA) technology, an ultra-wideband (UWB) technology, a Bluetooth (BT) technology, and other technologies.

In an exemplary embodiment, the electronic device 2100 may be implemented by one or more application-specific integrated circuits (ASIC), digital signal processors (DSP), digital signal processing devices (DSPD), programmable logic devices (PLD), field programmable gate arrays (FPGA), controllers, microcontrollers, microprocessors, or other electronic elements, for implementing the above methods for interactions in a live broadcast room.

In an exemplary embodiment, there is also provided a non-transitory computer-readable storage medium such as a memory 2104 including instructions which may be executed by the processor 2120 of the electronic device 2100, for performing the above-described method. For example, the non-transitory computer-readable storage medium may be a ROM, a random access memory (RAM), a CD-ROM, a magnetic tape, a floppy disk, an optical data storage device, etc.

A non-transitory computer-readable storage medium is provided. When the instructions in the storage medium are executed by a processor of the electronic device 2100, the electronic device 2100 is caused to execute a method for interactions in a live broadcast room.

A computer program product is provided. When instructions in the computer program product are executed by a processor of the electronic device 2100, the electronic device 2100 is caused to execute a method for interactions in a live broadcast room.

Those skilled in the art will easily think of other embodiments of the disclosure after considering the description and practicing the invention disclosed herein. The disclosure is intended to cover any variations, uses, or adaptive changes of the present invention which follow the general principles of the present invention and include common knowledge or conventional technical means in the art not disclosed in the disclosure. The description and the embodiments are to be regarded as exemplary only, and the true scope of the disclosure are indicated in the appended claims.

It should be understood that the present invention is not limited to the precise structure described above and illustrated in the drawings, and various modifications and changes may be made without departing from its scope. The scope of the present invention is only limited by the appended claims.

What is claimed is:

1. A method for interactions in a live broadcast room, applied to an anchor client, comprising:
    in response to an opening operation for a question interaction function in the live broadcast room:
        obtaining at least one piece of question information from a server, wherein the at least one piece of question information is sent by at least one audience client to the server;
        counting a number of pieces of question information obtained from the server;
        generating a display control based on the number of pieces of question information and displaying the display control in a second display area;
    in response to a triggering operation on the display control, displaying a question panel interface in the first display area;
    displaying a display card for each piece of question information on the question panel interface, wherein the display card further comprises an answer control and an end control;
    in response to a triggering operation on the answer control in a target display card, displaying the target display card on top of remaining display cards on the question panel interface;
    updating a state of target question information corresponding to the target display card to an answering state, and replacing the answer control in the target display card with the end control; and
    in response to a triggering operation on the end control in the target display card, updating the state of the target question information to a closed state, and removing the target display card from the question panel interface;
    obtaining an interaction parameter value corresponding to each piece of question information from the server; and
    adjusting a position of the question information in the first display area based on the interaction parameter value corresponding to each piece of question information.

2. The method of claim 1, wherein displaying the display card for each piece of question information on the question panel interface comprises:
    generating the display card for each piece of question information based on text content of each piece of question information and a preset display template, wherein the display template is configured to define a display format of the text content of question information, and the display card includes the text content of question information in the display format; and displaying the display card for each piece of question information on the question panel interface.

3. The method of claim 1, further comprising:

sending the answering state of the target question information to the server, wherein the server sends the answering state of the target question information to all audience clients where the live broadcast room is watched, so that all the audiences clients where the live broadcast room is watched find the target question information from a question list, and displaying the target question information on top of the question list.

4. The method of claim 1, wherein the interaction parameter value comprises a number of thumbs-up; and adjusting the position of the question information in the first display area comprises:

adjusting the position of the question information in the first display area based on a descending order of the numbers of thumbs-up corresponding to respective pieces of question information.

5. The method of claim 1, wherein a question form of the question interaction function includes any one or more of a text question form, a voice question form and a video question form.

6. The method of claim 1, further comprising:

starting timing in response to the live broadcast room being non-subjectively closed; and sending an obtaining request to the server when a time period from non-subjectively closing the live broadcast room to reopening the live broadcast room is less than a target threshold, wherein the obtaining request is configured to instruct the server to send remaining unanswered question information for the live broadcast room to the anchor client.

7. A method for interactions in a live broadcast room, applied to an audience client, comprising:

in response to a triggering operation on a question initiating control, displaying a panel interface in a third display area of the live broadcast room, wherein the question initiating control is generated after a question interaction function in the live broadcast room is opened, and the panel interface contains a question button;

in response to a triggering operation on the question button, popping up a question input box at a target position on the panel interface; and displaying question information inputted by a user into the question input box, and sending the question information to a server, so that the server sends the question information to an anchor client and other audience clients than the audience client in the live broadcast room for display;

wherein the method further comprises:

obtaining a state of answering question information sent by the anchor client from the server;

finding a target display card corresponding to the answering question information from the panel interface based on the state of the answering question information sent by the anchor client;

displaying the target display card on top of remaining display cards on the panel interface;

updating a state of question information corresponding to the target display card to an answering state, and displaying a thank you control in a target area of the target display card; and in response to a triggering operation on the thank you control, popping up a gift panel.

8. The method of claim 7, wherein displaying the question information inputted by the user into the question input box comprises:

receiving text content of the question information inputted into the question input box;

generating a display card based on the text content of the question information and a preset display template, wherein the display template is configured to define a display format of the text content of the question information, and the display card includes the text content of the question information in the display format; and displaying the display card in the panel interface.

9. The method of claim 8, wherein the panel interface further comprises display cards of question information initiated by the other audience clients and the display card also contains an interaction control, the method further comprises:

obtaining an interaction parameter value corresponding to each piece of question information displayed in the panel interface from the server, wherein the interaction parameter value is obtained by the server counting a number of triggering the interaction control on the display card; and adjusting a position of the display card in the panel interface based on the interaction parameter value corresponding to each piece of question information.

10. The method of claim 8, further comprising:

in response to a folding operation on the panel interface, hiding the panel interface;

determining answering question information sent by the anchor client, and generating an answering widget based on the answering question information and a preset generation template, wherein the answering widget includes text content of the answering question information; and displaying the answering widget in a fourth display area.

11. An apparatus for interactions in a live broadcast room, applied to an anchor client, comprising:

a processor; and a memory for storing instructions executable by the processor;

wherein the processor is configured to, in response to an opening operation for a question interaction function in the live broadcast room:

obtain at least one piece of question information from a server, wherein the at least one piece of question information is sent by at least one audience client to the server;

count a number of pieces of question information obtained from the server;

generate a display control based on the number of pieces of question information and display the display control in a second display area;

in response to a triggering operation on the display control, display a question panel interface in the first display area;

display a display card for each piece of question information on the question panel interface, wherein the display card further comprises an answer control and an end control;

in response to a triggering operation on the answer control in a target display card, display the target display card on top of remaining display cards on the question panel interface;

update a state of target question information corresponding to the target display card to an answering state, and replace the answer control in the target display card with the end control; and in response to a triggering operation on the end control in the target display card, update the state of the target question information to a closed state, and remove the target display card from the question panel interface;

obtain an interaction parameter value corresponding to each piece of question information from the server; and adjust a position of the question information in the first display area based on the interaction parameter value corresponding to each piece of question information.

12. The apparatus of claim 11, wherein the processor is further configured to:

generate a display card for each piece of question information based on text content of each piece of question information and a preset display template, wherein the display template is configured to define a display format of the text content of the question information, and the display card includes the text content of question information in the display format and an answer control; and display the display card for each piece of question information on the question panel interface.

13. The apparatus of claim 12, wherein the processor is further configured to send the answering state of the target question information to the server, wherein the server sends the answering state of the target question information to all audience clients where the live broadcast room is watched, so that all the audiences clients where the live broadcast room is watched find the target question information from a question list; and display the target question information on top of the question list.

14. The apparatus of claim 11, wherein the processor is further configured to:

start timing in response to the live broadcast room being non-subjectively closed; and send a question information obtaining request to the server when a time period from non-subjectively closing the live broadcast room to reopening the live broadcast room is less than a target threshold, wherein the question information obtaining request is configured to instruct the server to send remaining unanswered question information for the live broadcast room to the anchor client.

* * * * *